June 5, 1945. A. VENDITTY 2,377,469
UNIVERSAL JOINT
Filed July 31, 1942 3 Sheets-Sheet 1

Inventor
ANTHONY VENDITTY.
by Charles Hill
Attys.

June 5, 1945.　　　A. VENDITTY　　　2,377,469
UNIVERSAL JOINT
Filed July 31, 1942　　　3 Sheets-Sheet 2
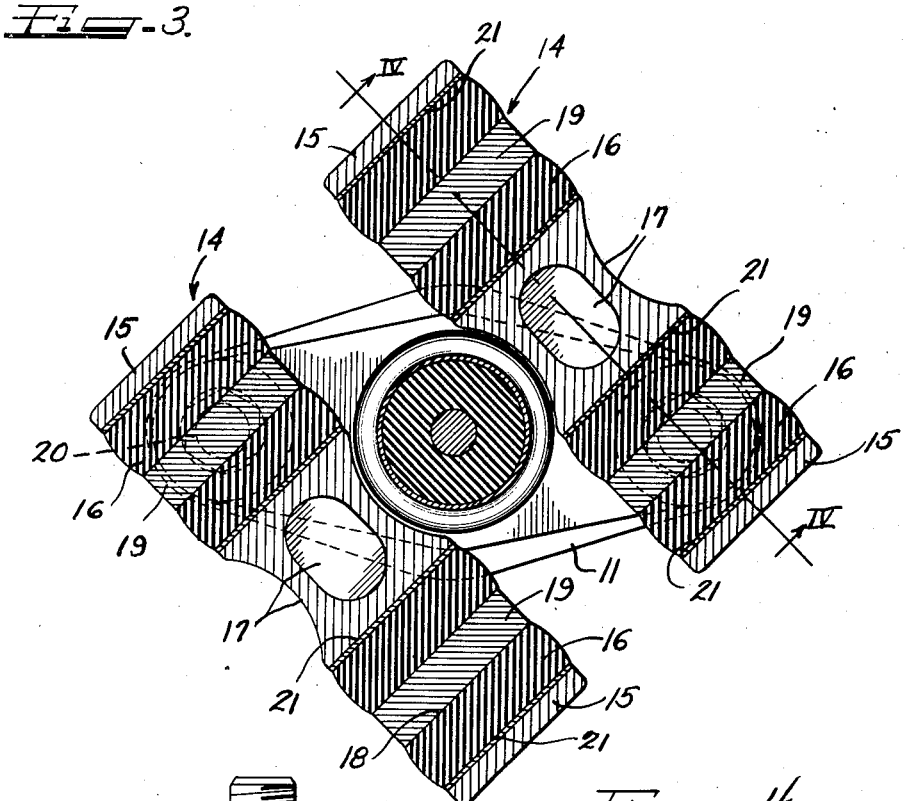
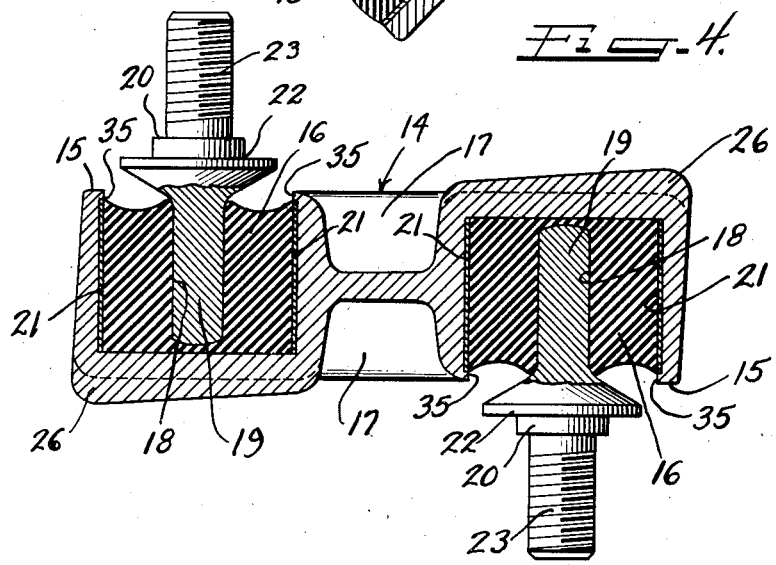
Inventor
ANTHONY VENDITTY.
by Charles Hull
Attys.

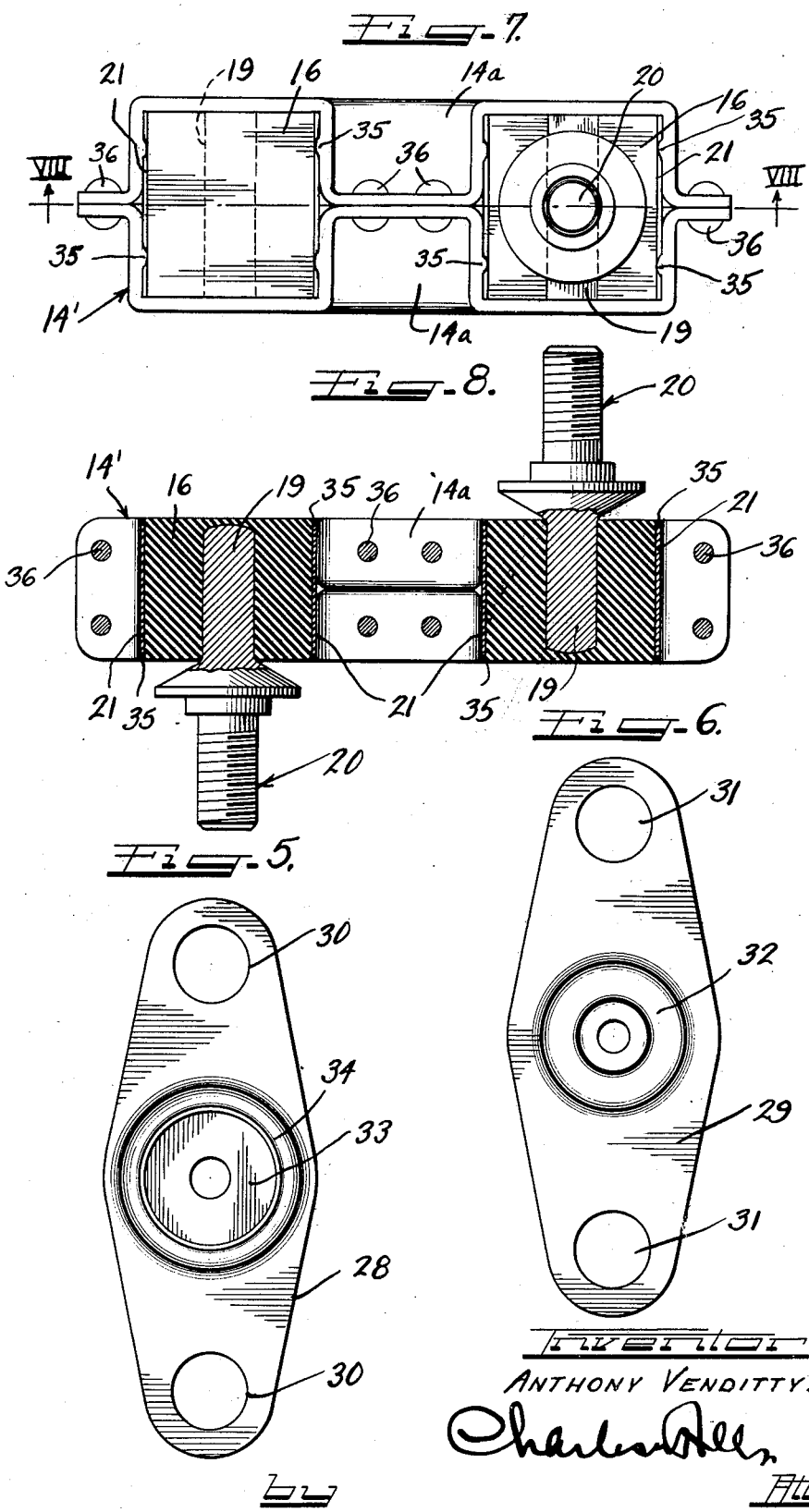

Patented June 5, 1945

2,377,469

UNITED STATES PATENT OFFICE 2,377,469

UNIVERSAL JOINT

Anthony Venditty, Detroit, Mich., assignor to Thompson Products, Inc., a corporation of Ohio Application July 31, 1942, Serial No. 452,998

10 Claims. (Cl. 64—11)

This invention relates to coupling members and, more particularly, to a universal joint which lends itself to economic production on a large scale.

An object of this invention is to provide an improved coupling member of unique and simple construction and which particularly lends itself to economical manufacture on a large scale.

Another object of this invention is to provide a universal joint with novel centering means for at all times tending to urge the opposed coupling members of the joint into axial alignment.

Still another object of this invention is to provide in a coupling a novel, but simple, torque transmitting member which may be either in the form of a forging or in the form of a stamping.

A still further object of the invention is to provide in a coupling of the type including opposed flanged coupling members, a plurality of radially offset joints, in each of which, by reason of the construction and arrangement of the components thereof, a more efficient transmission of the torque is effected with a minimum amount of wear.

A still further object of this invention is to provide in a coupling, of the type having connections embracing a stud and a block of rubber, an improved coaction between the stud and block of rubber whereby the area of contact between the stud and the surrounding block of rubber is increased for the purpose of prolonging the life of the rubber block and improving the operation of the joint, as well as decreasing the amount of rubber necessary in the block.

Still another object of the invention is to provide in a coupling of the above mentioned character stud and socket connections which will afford an increased area of contact between the stud and the rubber block for the same overall diameter of the universal joint without necessitating a reduction of the angular limits of operation of the joint and so that, when the stud and socket are subjected to torque, the ratio of the loading area or rubber displacing stress to shearing stresses is considerably increased over that existent in previous joints.

In accordance with the general features of this invention, there is provided in a coupling opposed coupling members, each having a flange disposed in angular relation to the flange of the other coupling member, the flanges presenting at least four ends to be connected, and a pair of torque transmitting members each connecting the end of one flange to an adjoining end of an opposed flange and being arranged in parallel in the plane between the flanges and which plane is at right angles to the axis of the coupling.

Another feature of the invention relates to the provision of torque transmitting members of the aforementioned character which lend themselves to manufacture either in the form of steel forgings or of metallic stampings whereby such members may be economically manufactured on a large production scale.

A further feature of the invention relates to the provision of torque transmitting members of the aforementioned character, each of which has oppositely facing rubber sockets cooperable with flattened ends of connecting studs whereby a large area of contact is provided between the stud and the rubber block enabling a reduction in the amount of rubber in the block and increasing the ratio of the loading area or rubber displacing stress to the shearing stress without necessitating a change in the overall diameter of the joint or coupling.

An additional feature of the invention relates to the provision in a joint or a universal coupling of the aforementioned character, centering means at the axis of the coupling members for connecting them together independently of the radially offset joints between the coupling members and constructed and arranged to tend to urge the coupling members into axially aligned relation.

Other objects and features of this invention will more fully appear from the following detailed description taken in connection with the accompanying drawings, which illustrate several embodiments of the invention and in which:

Figure 3 is a cross-sectional view taken on the line III—III of Figure 2 looking downwardly;

Figure 4 is a cross-sectional view of one form of my torque transmitting member and taken on the line IV—IV of Figure 3 looking in the direction indicated by the arrows;

Figure 5 is a detail or plan view of one of the stampings used in my centering device;

Figure 6 is a plan or detail view of another flange used in my centering device;

Figure 7 is a plan view of a modified form of torque transmitting member; and

Figure 8 is a cross-sectional view taken on the line VIII—VIII of Figure 7 looking upwardly.

As shown on the drawings:

Figure 1:
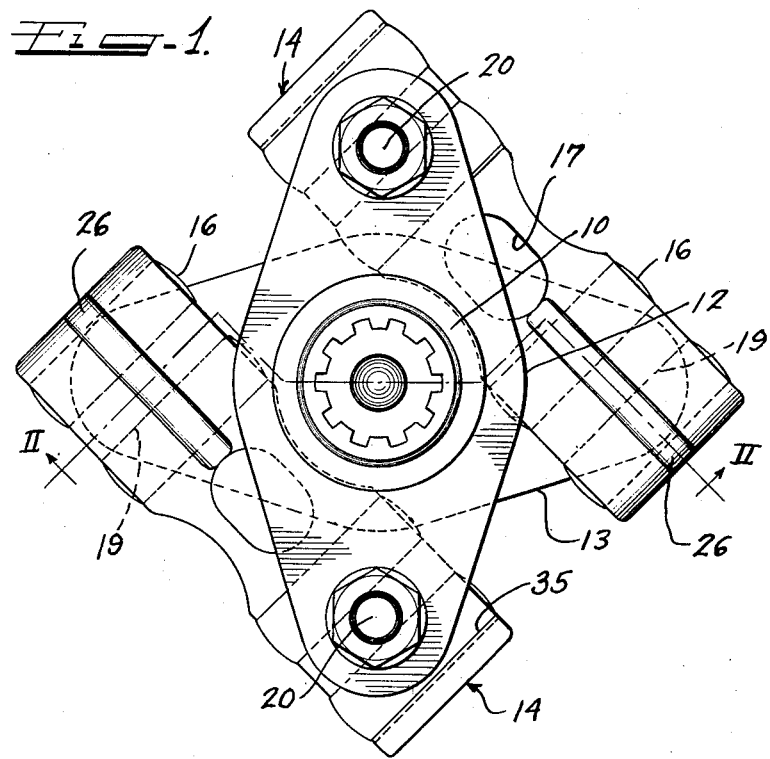
Figure 1 is a plan view of a universal joint of my invention.
Figure 2:
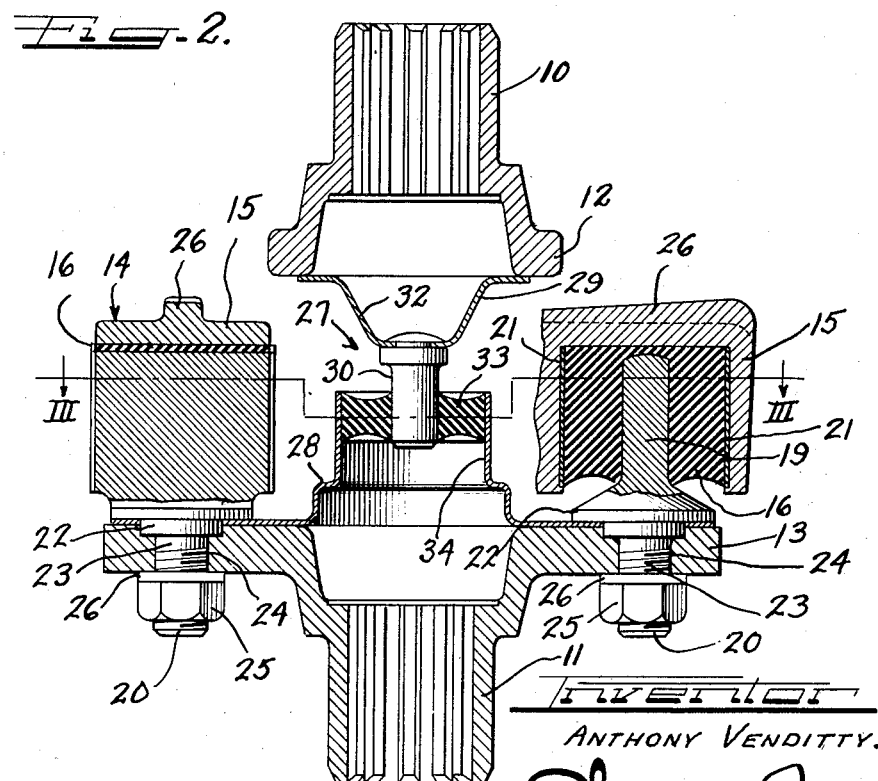
Figure 2 is a cross-sectional view taken on the angular line II—II of Figure 1 looking in the direction indicated by the arrows.

Reference to Figures 1 and 2 reveals that my coupling or universal joint is of a type which dispenses with the necessity for the use of an intermediate spider of cruciformed cross-section, such as is well known in the art. In fact, it is an aim of this invention to provide torque transmitting means between the couplings of the joint which need not be in the form of a cruciform or spider and which, as a consequence, may be very economically manufactured on a large scale.

The reference characters 10 and 11 designate axially aligned but opposed coupling members, each of which is splined in the usual way for the accommodation of an end of a shaft or subshaft as is well known in the art.

The coupling member 10 has a double-ended flange 12, and the coupling member 11 has a corresponding double-ended flange 13, these two flanges 12 and 13 being arranged at right angles to each other as is shown in Figure 1.

The opposed faces of the two flanges 12 and 13 are separated a predetermined distance from each other, as shown in Figure 2, whereby the intermediate torque transmitting members 14 may be positioned between the opposed faces for connecting the two coupling members 10 and 11 together. I have designated each of these torque transmitting members or devices generally by the reference character 14 and, since these members are identical in construction except for their reversal in relative positions, a description of one will suffice for both.

As best shown in Figure 4, each of the torque transmitting members 14 comprises a steel forging having at its extremities oppositely facing U-shaped recess portions 15—15, in each of which is disposed a socket defining rubber block 16. The two recess portions 15—15 or, in other words, the socket ends of the torque transmitting member 14, are interconnected by horizontal and vertical webs formed by providing cup-shaped depressions 17—17 in the intermediate section of the member 14. This construction effects a material lightening of the member 14 without detracting from its requisite strength.

Each of the rubber blocks 16 has extending therethrough an elongated channel-shaped socket 18 (Figure 3) open at its ends and of a configuration to have tightly fitted therein a flattened end 19 of a torque transmitting stud 20 (Figure 4). The flat area or surface of each of the flattened stud ends 19 is so arranged as to face and be in the path of the torque being transmitted between the coupling members. This arrangement is such as to provide a relatively large torque transmitting area without necessitating an increase in the overall diameter of the joint and, at the same time, to enable a material reduction in the amount of rubber used in the block 16. That is to say, much less rubber is needed in the block 16 by reason of the use of a long channel 18 therein as distinguished from a small, circular stud-hole, such as has been used in the past in rubber joints of coupling members.

It will be noted from Figure 3 that the two identical torque transmitting members 14—14 are arranged in parallel and that the four loading areas are disposed in two parallel planes at right angles to the longitudinal plane of each of the torque transmitting members. In addition, it will be noted that each of the U-shaped socket defining or rubber receiving ends of the members 14 is open on the lateral sides of the members 14 so that each rubber block, when pressed into one of the U-shaped portions, can be bulged or displaced laterally along the loading surface or area of each of the flattened stud ends 19. This provides for displacement of the rubber at right angles to the direction of the application of the torque or loading force to the loading surface of the flattened ends 19 of the stud.

In addition, each of the U-shaped ends of each member 14 may be provided with a pair of steel liner plates 21—21 arranged parallel to the flattened ends of the stud 19 so that these plates like the flattened ends 19 are disposed in the path of or at right angles to the torque transmitted from one coupling member to the other.

It will further be perceived that each of the studs 20 has an enlarged shouldered or stepped portion 22 for cooperation with a flange of one of the coupling members as well as a threaded end 23 adapted to extend through a corresponding opening 24 in a flange and adapted to be bolted to the flange by a nut 25 and a washer 26 (Figure 2). When thus bolted to the flange, the stud has a part of its stepped portion 22 fitted into a countersunk end of the opening 24 as is obvious from Figure 2, and whereby a close fit is provided between the stud and the flange of the coupling member.

Attention is also directed to the fact that in order to increase the strength of each of the U-shaped extremities 15 of the torque transmitting member 14, the U-shaped ends may be ribbed at 26 as shown in Figures 1, 2, and 4.

In the normal operation of this device as a universal joint, the coupling members will, at times, become cocked and I have found it desirable to provide a centering means or device which will at all times tend to urge the coupling members into axial alignment. This centering device, designated generally by the reference character 27 in Figure 2, is disposed in the space separating the parallel torque transmitting members 14—14 and in axial alignment with the coupling members 10 and 11.

The device 27 comprises two oppositely disposed metal stampings or shells 28 and 29 connected by an axial stud 30. The two flange-like stampings 28 and 29 are shown in elevation in Figures 5 and 6. The stamping 28 has its opposite ends provided with openings 30—30 through which the stepped portions of two of the studs 20 can extend. Similarly, the ends of the stamping 29 are provided with diametrically opposite openings 31—31 for accommodating the stepped portions 22 of the other pair of studs 20—20. Thus the stud assemblies can be used to clamp these two stampings 28 and 29 to the flanges of the respective coupling members 10 and 11.

The intermediate or central portion of the stamping 29 is bossed or depressed at 32 and it is to this depressed or bossed portion 32 that the head end of the stud 30 is suitably anchored or fastened. The other end of the stud 30 extends into and is cushioned in a ring of rubber 33 secured in an upwardly extending cup portion 34 formed in the other stamping 28.

From the foregoing description of the centering device 27, it will be appreciated that there is provided a connecting stud or pin between the coupling members, one end of which is rigidly fastened to one coupling member 10 and the other end is connected to the other coupling member 11 through a cushioning ring 33 of rubber. The ring 33, as well as the blocks of rubber 16, may be made of any suitable rubber such, for example, as vulcanized rubber.

In the operation of the coupling and upon cocking of the two coupling members 10 and 11 relative to each other, the connecting pin or stud 30 will tend, through the rubber cushion 33, to urge the two coupling members back into axial alignment or, in other words, to bring them into their normal centered positions.

Attention is also directed to the fact that in each of the torque transmitting members 14, as best shown in Figure 4, the liner or bushing plates 21, as well as the rubber blocks 16, may be more tightly retained in the respective U-shaped ends of the member by peening the lips of the legs of the U-shaped portion over the exposed extremities of the plates 21. I have designated these peens by the reference character 35. These peens may be provided by any suitable press or hammer operation and assist in preventing movement of the plates 21 and the rubber blocks 16 out of the respective U-shaped ends of the torque transmitting members 14.

In Figures 7 and 8, I have illustrated a modified form of torque transmitting member 14' which differs principally from the member 14 in that, instead of comprising a steel forging body, the body is made of two metal stamping halves 14a—14a suitably anchored together by means of rivets 36.

Inasmuch as the remaining structure of this modified form of torque transmitting member 14' is the same as that of the previously described member 14, I have designated the elements common to both forms of invention by the same reference numeral. It is understood that the description heretofore given in connection with the elements common to both forms of the invention is also applicable to this modification.

It should be noted that in this modification, the ends of the stampings 14a provide spaced rectangular frames instead of U-shaped ends for accommodating the rubber blocks 16. In other words, each of the rubber blocks 16 is confined on all of its lateral sides but is unconfined at the sides disposed at right angles to the direction of the studs. This arrangement permits of the displacement of the rubber longitudinally of the studs when subjected to the pressures and stresses set up by the transmission of torque from one coupling member to the other.

It will, of course, be understood that various details of construction may be varied through a wide range without departing from the principles of this invention and it is, therefore, not the purpose to limit the patent granted hereon otherwise than necessitated by the scope of the appended claims.

I claim as follows:

1. In a universal joint including spaced opposed coupling members and studs projecting therefrom into the space therebetween, the improvements of a pair of torque transmitting members each connecting a stud of one coupling member with a stud of the opposed coupling member, each of said torque transmitting members having oppositely facing open ended channel portions, a rubber block in each channel portion, said studs having flat faces parallel to the side walls of the channels embedded in the rubber blocks, and said rubber blocks having exposed end walls at the open ends of the channels accommodating interparticle flow of the rubber during operation of the universal joint.

2. In a universal joint opposed coupling devices each having an elongated flange disposed at right angles across the elongated flange of the opposed coupling device to provide at least four ends to be connected, a pair of parallel torque transmitting members each connecting the end of one flange to an adjoining end of the opposite flange, each of said torque transmitting members having at its ends oppositely facing open ended channels, flat faced studs projecting from the extremities of said flanges into said channels, and rubber blocks in said channels having flat faced recesses parallel to the side walls of the channels to snugly receive the flat faces of the studs, said rubber blocks having exposed end walls at the open ends of the channels accommodating interparticle flow of the rubber during operation of the universal joint.

3. In a joint opposed coupling members each having a flange with stud connections disposed in angular relation to the stud connections on the flange of the opposite member, said flanges presenting at least four stud connections to be interconnected, each of said stud connections including a stud with a flattened load carrying end, a pair of torque transmitting members each connecting the stud connection of one flange to an adjoining stud connection of an opposite flange, said torque transmitting members being parallelly arranged and having at four corners of the joint U-shaped sockets alternately facing in opposite directions, there being two on each transmitting member and each having a rubber block therein as well as an elongated open-ended recess receiving a flattened stud end embraced by the rubber block.

4. In a universal coupling opposed coupling members each of the flange arm type and the flange arm on one member being radially offset 90° from the other so that said flange arms are at right angles to each other and present four equidistantly spaced ends, a stud anchored to each of said ends, a pair of spaced parallel torque transmitting members interposed between said coupling members, each having a pair of diametrically opposed sockets, one being aligned with the stud on one flange arm and the other facing in an opposite direction and being aligned with the stud on the other flange arm, and a resilient coupling member aligning device between the coupling members and torque transmitting members having parts carried by the coupling members.

5. In a coupling opposed coupling members each of the flange type and each flange having a plurality of stud anchoring areas offset radially from the axis of the coupling, a stud anchored to each of said areas and a pair of torque transmitting members interposed between said coupling members, each having a pair of diametrically opposed sockets, one being aligned with a stud on one flange and the other facing in an opposite direction and being aligned with a stud on the other flange, each of said sockets being formed of rubber and said studs each having a flattened end of considerably greater width than the diameter of the stud and each of said flattened ends being tightly but resiliently held in the corresponding rubber socket of the torque transmitting member, each of said torque transmitting members including a metal forging and each of said sockets being defined by a U-shaped portion on the end of said transmitting members, said U-shaped portions on each transmitting member facing in opposite directions along the axis of the coupling.

6. In a universal coupling opposed coupling members each of the flange type and each flange having a plurality of stud anchoring areas offset radially from the axis of the coupling, a stud anchored to each of said areas and a pair of torque transmitting members interposed between said coupling members, each having a pair of diametrically opposed sockets, one being aligned with the stud on one flange and the other facing in an opposite direction and being aligned with the stud on the other flange, said transmitting members comprising metal stampings and each member being made of two duplicate halves provided with spaced angular U-shaped recesses at the ends thereof that define rectangular housings that are open at both ends in each of which housings is tightly clamped a block of rubber, each block having a stud receiving recess.

7. For use in a coupling having opposed coupling members, a torque transmitting member for disposition between and for connecting the coupling members comprising a metallic body having transversely mounted in it angular blocks of rubber each having an elongated closed bottom recess for receiving a flattened end of a stud, the recess of one block opening in an opposite direction from that of the other, each rubber block having exposed end walls accommodating interparticle flow of rubber during operation of the coupling.

8. For use in a coupling having opposed coupling members, a torque transmitting member for disposition between and for connecting the coupling members comprising a metallic body having transversely mounted in it blocks of rubber each having an elongated open ended recess for receiving a flattened end of a stud, the recess of one block opening in an opposite direction from that of the other, the rubber blocks having exposed end walls transverse to the flattened ends of the studs to accommodate interparticle flow of rubber during torque transmission, said metallic body comprising a forging with its ends formed into opposite facing U-shaped portions in which said rubber blocks are retained.

9. In a coupling, opposed coupling members, a pair of parallel torque transmitting members offset radially from the axis of the coupling members and disposed between the coupling members for connecting them together, and a plurality of studs for fastening the torque transmitting members to the coupling members, each stud having opposed flat broad faces, said transmitting members each comprising an elongated metal body having mounted in its opposite ends blocks of rubber each having an elongated closed bottom recess for receiving said faces of a stud, the recess of one block opening in an opposite direction from that of the other, the recess in each block being open through the end walls of the block to expose the portions of the stud between the broad flat faces thereof, said transmitting members being identical and interchangeable.

10. In a coupling, spaced opposed crossed flange arms, plates overlying each flange arm, studs projecting through said plates and the ends of the flange arms anchoring the plates on the flange arms and having flat end portions projecting from the flange arms and plates into the space between the flange arms, said flat end portions being disposed at substantially a 45° angle relative to the flange arms, one of said plates defining a housing at the axial center of the coupling, the other of said plates carrying a stud at the axial center of the coupling projecting into said housing, a resilient bushing in said housing receiving said plate carried stud, a pair of spaced parallel torque transmitting members between the flange arms each having socket ends opening in opposite directions and respectively receiving the flattened ends of a stud on each flange arm, and rubber blocks seated in said socket portions having flat-faced recesses snugly receiving the flat ends of the studs.

ANTHONY VENDITTY.